United States Patent [19]

Detroit

[11] Patent Number: 4,505,825

[45] Date of Patent: Mar. 19, 1985

[54] OIL WELL DRILLING CLAY CONDITIONER

[75] Inventor: William J. Detroit, Schofield, Wis.

[73] Assignee: Reed Lignin Inc., Rothschild, Wis.

[21] Appl. No.: 534,722

[22] Filed: Sep. 22, 1983

[51] Int. Cl.³ .................................................. C09K 7/02
[52] U.S. Cl. ............................. 252/8.5 C; 252/8.5 A; 530/500
[58] Field of Search ............. 252/8.5 R, 8.5 C, 8.5 A, 252/8.55 E; 260/124 R

[56] References Cited

U.S. PATENT DOCUMENTS

| | | |
|---|---|---|
| 2,935,473 | 5/1960 | King et al. |
| 3,168,511 | 2/1965 | King et al. ................... 252/8.5 C X |
| 4,149,900 | 4/1979 | Childs et al. |
| 4,374,738 | 2/1983 | Kelley . |

*Primary Examiner*—Leland A. Sebastian
*Attorney, Agent, or Firm*—Andrus, Sceales, Starke & Sawall

[57] ABSTRACT

A high quality chrome lignosulfonate for use as an oil well drilling additive is produced from molecular weight and/or high carbohydrate containing spent sulfite liquor. The additive is obtained by adding boron prior to the oxidation of the lignosulfonate and complexing with chrome. The use of boron allows the raw material spent sulfite liquor source to be less pure and from a wide variety of wood.

20 Claims, No Drawings

OIL WELL DRILLING CLAY CONDITIONER

BACKGROUND OF THE INVENTION

The present invention relates to additives or conditioners for oil well drilling fluids, and more particularly to a boron-chrome lignosulfonate drilling fluid additive or conditioner.

The most commonly used drilling fluids are aqueous dispersions of clay. The drilling fluid or "mud" is pumped down a hollow drill string, through the bit at the bottom, and up the annulus formed by the hole or casing and the drill string to the surface. After reaching the surface, various operations are performed on the drilling fluid to remove the cuttings and formation material therefrom. The drilling fluid is then treated with additives to obtain a desired set of rheological properties, and is then pumped back into the well in a continuous circulating process.

A satisfactory drilling fluid must have various desired functions, such as gelling during temporary work stoppage and other functions well known in the art, which contribute to the success of the well drilling operation. In order to accomplish these various functions, it has been found necessary to incorporate certain additives in the drilling fluid. Modified lignosulfonates derived from spent sulfite liquor obtained from the pulping of woods have proven to be effective additives for obtaining the desired properties in drilling fluids.

In order to improve the effectiveness of the liqnosulfonates as drilling fluid additives, King et al. U.S. Pat. No. 2,953,473 recommended the use of certain metal salts of liqnosulfonate wherein the metals are chromium, aluminum, iron, copper or combinations thereof, which salts may or may not be oxidized. Of the metal lignosulfonate salts disclosed in the King et al. patent, the chromium salt has been found to be very effective so that the chromium salt by itself or in combination with other metals has become commonly used as a drilling fluid additive. See for example, Hoyt, U.S. Pat. No. 3,035,042 in which the additive is an iron-chromium lignosulfonate complex, and Van Dyke et al. U.S. Pat. No. 3,076,758 wherein the additive is an iron-free chromium lignosulfonate. Chrome-free additives are also well known, and Kelley U.S. Pat. No. 4,374,738 is an example of such a drilling fluid composition. Additionally, boron has been complexed with chrome free lignosulfonates for drilling fluid additives as discussed in application Ser. No. 06/372,141 filed Apr. 27, 1982, now U.S. Pat. No. 4,457,853, and assigned to the assignee of the present application. Boron has also been added to lignosulfonates to increase set times for oil well cementing compositions as described in Childs et al., U.S. Pat. No. 4,149,900.

One problem with utilizing lignin containing products such as the spent sulfite liquor from pulping processes to produce a chrome complexed drilling fluid additive is that such liquor does not contain pure lignosulfonate. The spent sulfite liquor generally contains only about 40% to 60% by weight lignosulfonates with the remainder being carbohydrates and other organic and inorganic constituents dissolved in the liquor. If these carbohydrates remain in the liquor, they react with chrome during the oxidation-reduction-complexing reaction to form a gel resulting in a poor quality oil drilling mud conditioner. As a result, the spent sulfite liquor must be subjected to different treatments such as alkaline, acid, or heat treatments as well as reacted with other chemicals to modify or remove various undesired non-lignin constituents. However, such additional processing of the spent sulfite liquor is costly. It is thus desirable to provide a high quality chrome lignosulfonate for use as an oil well drilling mud conditioner which is produced from less pure spent sulfite liquors containing sugar acids and polysaccharide carbohydrates.

SUMMARY OF THE INVENTION

A high quality chrome lignosulfonate for use as an oil well drilling additive made from high carbohydrate containing spent sulfite liquor. The carbohydrates are complexed with boron prior to oxidation of the lignosulfonates and complexing with chrome resulting in an oxidized complexed chrome lignosulfonate. When used as an additive in an oil well drilling fluid, the oxidized complexed chrome lignosulfonate produced from boron treated raw material liquor exhibits improved rheological properties over other drilling fluid additives.

The boron complexed chrome lignosulfonate eliminates the necessity of purifying spent sulfite liquor and therefore significantly decreases the production cost of the additive.

DETAILED DESCRIPTION OF THE INVENTION

A boron compound, preferably boric acid, is complexed with a sulfonated lignin containing material prior to the oxidation of the lignin containing material with chrome. The resulting boron-chrome lignosulfonates provide a drilling fluid additive which significantly enhances the rheological properties of a drilling fluid. Additionally, the boron-chrome lignosulfonates can be obtained from a spent sulfite liquor that is less pure having high carbohydrate constituents. The liquor may be available from a wide variety of wood, including hardwood. More specifically, the boron-chrome lignosulfonates of the present invention exhibit improved apparent viscosities, yield points, water loss, and ten minute gel strengths, as well as higher temperature stability, compared to chrome lignosulfonates without boron.

The lignin containing starting materials which are useful in making the products described herein are well known and, in general, they are described in the aforementioned King et al. patent. The desired starting lignosulfonates are usually spent lignin liquors obtained from the pulping of wood. Lignosulfonates of hard wood or soft wood origin, obtained from calcium sulfite spent liquor provide a particularly desirable source of starting raw material in the practice of this invention. Preferably, these lignosulfonates are treated to remove their reducing sugars by fermentation (alcohol or yeast) or by using calcium bisulphite under high temperature and high pressure. The spent sulfite liquor and particularly the sugar destroyed, calcium based spent sulfite liquors, will hereinafter be referred to generally as "sulfonated lignin containing materials".

The sulfonated lignin containing materials obtained from the pulping of wood will generally contain lignins as well as other constituents. For example, the spent sulfite liquor generally contains only about 40% to 60% by weight of lignosulfontes the remainder being carbohydrates such as reducing sugars, sugar acids and polysaccharides and other organic and inorganic constituents dissolved in the liquor. Reducing sugars are those carbohydrates having up to six or seven carbon atoms such as glucose, arabinose and other pentoses and hexoses. These carbohydrates can easily react with chrome during the oxidation-reduction-complexing reaction to form a gel resulting in a poor quality oil well drilling mud conditioner. In order to obtain a more pure starting material the sulfonated lignin containing materials are thus generally subjected to different treatments such as alkaline, acid or heat treatments as well as being reacted with various chemicals to modify or remove some of the non-lignin constituents. In particular, the reducing sugars are removed by fermentation or other known methods.

Surprisingly, however, it has been found that the addition of boron prior to the reaction with chrome during the oxidation-reduction-complexing reaction of the lignosulfonate material enables the lignosulfonate to react with chrome and form the proper chrome complex for drilling mud conditioning even though the raw material contains carbohydrates. The theory is offered, but not bound by, that the boron is complexing with the cis-diol groups of the carbohydrates in the spent sulfite liquor in the following manner:

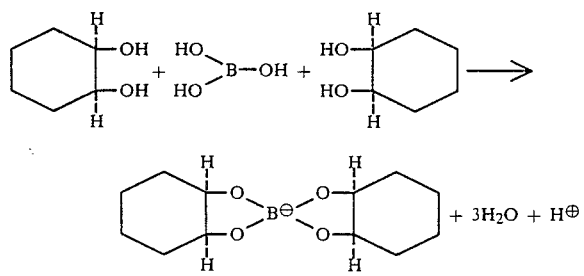

The boron in accordance with the above example eliminates the possible reaction of the carbohydrate portion of the lignosulfonates with chrome during the oxidation-reduction-complexing reaction to thereby prevent gel formation. The carbohydrate being complexed by boron is believed to be the larger molecular weight hemicellulose or polysaccharide that under chrome reaction can easily form a gel with the lignosulfonate resulting in a poor quality oil well drilling additive. Thus, when using boron in accordance with the present invention, it is not necesary to separate the lignin containing constituents from the other constituents in the spent sulfite liquor. The use of boron allows the raw material source to be less pure and from a wide variety of wood, including 100% hardwood.

The products of the present invention are obtained by adding a boron compound to a sulfonated lignin containing material under acidic conditions prior to the oxidation of the lignosulfonate with chrome, and finally followed by recovering the boron-chrome lignosulfonate. Additionally, external oxidation of the sulfonated lignin-containing material may also be accomplished with manganese dioxide ($MnO_2$) or any of the oxidizing agents disclosed in the aforementioned King et al patent followed by complexing with a chrome compound and recovery of the boron-chrome lignosulfonate. King et al discloses that such oxidizing agents may be selected from the group consisting of hydrogen peroxide, ozone, lead dioxide, chromic acid, chlorine, alkali and alkaline earth metal hypochlorites, alkali metal chromate, alkali metal permanganate, alkali metal persulfate, alkali metal perborate, and combinations thereof. Thus, reduced trivalent chrome compounds may be employed as a complexing agent if the sulfonated lignin-containing material has previously been oxidized.

Initially, the sulfonated lignin containing material may optionally be activated by heat treatment with an acid, aldehyde polymerization, oxidation with an oxidizing agent, ultrasonic energy, or a combination thereof. Where such activation step is used, mineral acids such as sulfuric acid, nitric acid, phosphoric acid or hydrochloric acid may be effectively employed, with sulfuric acid constituting the preferred mineral acid. Acid activation may be conveniently carried out at a temperature of from about 60° C. to about 90° C. for a period of about one hour using from about 10 to about 35 weight percent, preferably from about 20 to about 25 percent of acid based on the solids content of the lignosulfonates starting material, and depending on the particular lignosulfonate starting material.

The sulfonated lignin containing material, which may have been activated, is then reacted with a boron compound, which is, preferably, boric acid ($H_3BO_3$), followed by oxidation, preferably, with chrome. The addition of boron and the oxidation with chrome are both carried out under acidic conditions, using any one of the aforementioned mineral acids, preferably sulfuric acid.

Although boric acid is the boron compound of choice in the practice of this invention, other compounds of boron may also be used, if desired. Such boron compounds include sodium tetraborate pentahydrate, sodium metaborate and hydrates, and sodium tetraborate anhydrous and decahydrate (borax). Also, the boron halides such as fluorides, chlorides, bromides and iodides as well as boron oxide and boron sulfide may be used.

The amount of boron compound which can be used depends on the type of lignosulfonate starting material. Sufficient boron compound is added so that the boron content, in the final product is from about 1 to about 3 weight percent, and is preferably about 2 percent.

Chromium compounds useful in the practice of this invention may include hexavalent oxidizing chrome compounds such as sodium dichromate, potassium dichromate and chromic acid (chromium trioxide). With external oxidation processing, reduced trivalent chrome compounds can be used alone or in combination with hexavalent chrome compounds. Reduced chrome compounds could be chrome sulfate and hydrates, chrome nitrate, chrome halides and chrome acetate.

The amount of chromium compound which can be used also depends on the type of lignosulfonate starting material. Sufficient chromium compound is added so that the chrome content, based on the final product, is from about 2 to about 5 weight percent, and is preferably from about 3 to about 4 weight percent.

The addition of the boron to the lignosulfonate is carried out under highly acidic conditions at atmospheric pressure at a temperature of from about 60° C. to about 100° C. The reacton mass is then held at a temperature of from about 80° C. to about 100° C. from about 30 minutes to about one hour. Following this, the reaction mass is cooled to between about 55° C. and 60° C.

The oxidation of the lignosulfonate with the chromium compound is carried out under highly acidic conditions at atmospheric pressure and a temperature of from about 50° C. to about 70° C. Since this oxidation reaction is highly exothermic, the mixture must be cooled with agitation so that the temperature does not exceed about 70° C. The rate of addition of the chrome depends on its purity and concentration, the concentration of the solids in the lignosulfonate and the effectiveness of agitation. This rate is usually controlled so that the reaction is completed within several minutes to two hours, preferabaly within ten minutes to one hour.

After completion of the oxidation reaction, it is desirable to adjust the pH of the resulting mixture by the addition of a suitable base such as an alkali metal hydroxide or alkaline earth metal hydroxide to raise the pH to about 3.0 to 4.0. These hydroxides include sodium hydroxide, potassium hydroxide, calcium hydroxide and lithium hydroxide. The neutralization step is usually carried at between 50° C. and 60° C., which is the temperature of the mixture upon completion of the oxidation step, but may also be carried out at ambient conditions. Due to its low cost, sodium hydroxide constitutes the hydroxide of choice and is usually used in dilute concentrations, as for example, in a 20% solution.

The recovered boron-chrome lignosulfonates contain from about 1% to about 3%, preferably about 2%, boron, and from about 2% to about 5%, preferably from about 3% to about 4%, chrome, based on the weight of the boron-chrome lignosulfonate product.

When using sulfuric acid in the activation step, or in the direct oxidation of the sulfonated lignin containing materials, calcium sulfate (gypsum) will precipitate from the mixture. Thus, after the neutralization step, the calcium sulfate precipitate must be removed by any well known method, such as rotary vacuum fulters, centrifugation, filtration, settling, and the like.

The resulting filtrate solution, after removal of the precipitated gypsum, may be spray dried at 230° F. to 240° F. inlet temperature to recover solid powder boron-chrome lignosulfonate. Additionally, the resulting filtrate solution may be shipped in liquid form. Whether the ultimate product is a liquid or a spray dried powder, the boron-chrome lignosulfonates produced by the present invention exhibit all the desirable rheological attributes required for a good drilling fluid clay conditioner. These properties include apparent viscosity, yield point, water loss, and ten minute gel strength.

The following examples will further serve to illustrate the preparation of the products of this invention and their advantageous drilling fluid conditioning properties. It must be understood, however, that these examples are merely illustrative and are not intended to limit the scope of the present invention.

In the following examples, all measures of apparent viscosity, yield point, gel strength and Fann degree readings were made in accordance with API recommended practice 13B "Standard Procedure For Testing Drilling Fluids", Sixth Edition, April, 1976, published by the American Petroleum Institute.

EXAMPLE I

This example illustrates the applicability of the invention to spent sulfite liquor obtained from softwood with only the reducing sugars destroyed. Example I-A exemplifies a drilling fluid additive with no boron added while example I-B exemplifies a drilling fluid additive with boron added.

EXAMPLE I-A 50 grams of a sugar destroyed, calcium base softwood spent sulfite liquor (B-41 Lignosol B, available from Reed Lignin Inc.) solids as 25% solution in water was heated to 45° C. and treated with 10 grams of sulfuric acid (100%) as a 40% solution in water (25 grams) under mechanical agitation. The acidic reaction mixture was heated to 52° C. and treated with 5.1 grams of sodium dichromate dihydrate (100%) as a 20% solution in water (25.5 grams). The mixture was cooled to 25° C. and neutralized from 1.9 pH to 4.0 pH by adding 20 milliliters of 120 grams per liter calcium oxide slurry (2.4 grams of CaO). The reaction mass was heated to 40° C. and filtered to remove precipitated gypsum (calcium sulfate dihydrate, 13 grams) which was discarded. The filtrate solution, containing approximately 50.9 grams of solids as a 19.2% solution (265 grams), was spray dried at 230° F. inlet temperature to recover solid powder chrome lignosulfonate.

EXAMPLE I-B

Another 50 grams of sugar destroyed calcium base softwood spent sulfite liquor, as in Example I-A, was diluted to 25% solids and treated with 10 grams of sulfuric acid as in Example I-A. The reaction mass was heated to 70° C. and 7.2 grams of boric acid added. The reaction mass was cooled to 57° C. over a 25 minute period and 5.5 grams of sodium dichromate dihydrate (100%) as a 20% solution in water (27.5 grams) added over a 10 minute period. The resulting reaction mixture was neutralized from 2.0 pH to 3.5 pH with 14 milliliters of 120 grams per liter calcium oxide slurry (1.68 grams of CaO). The reaction mass was filtered to remove precipitated gypsum (calcium sulfate dihydrate, 13 grams) which was discarded. The resulting filtrate solution, containing approximately 53.5 grams of boron-chrome lignosulfonate, was spray dried at 230° F. inlet temperature to recover solid powder boron-chrome lignosulfonate.

The two materials recovered in Examples I-A and I-B were evaluated as an additive in calcium montmorillonite clay system and compared to commercially available chrome lignosulfonates as well as chrome-free lignosulfonate for oil well drilling clay conditioning. The comparative results are shown in Table 1.

The evaluation test is described below using aged 28% Panther Creek calcium bentonite prepared in deionized water.

Test Procedure (1) Add 1.75 grams of salt to a barrel equivalent (350 cc) of 28% by weight Panther Creek bentonite which has been aged for at least seven days.

(2) Stir for three minutes on a Hamilton Beach mixer at 7500±500 rpm.

(3) Add 5 grams of the sample to be tested.

(4) After the sample has been mixed with the mud for one minute, add sufficient caustic soda solution (1 ml=0.25 gram sodium hydroxide) so that the pH measures 9.5±0.1 after 20 minutes of total stirring time.

(5) The mud is stirred on a Hamilton Beach Model 30 mixer at 7500±500 rpm during this 20 minute stirring time.

(6) Measure the flow properties on a Fann Model 35G viscosimeter. Record the values of apparent viscosity (cps), yield point (lbs./100 sq.ft.), degree Fann readings (600, 300, 3) and 10 minute gel strength (lbs./100 sq.ft.).

(7) Hot roll the sample overnight at 150° F.

(8) Cool the samples to room temperature. Readjust the pH to 9.5±0.1 with additional caustic soda solution and stir for five minutes before measuring hot roll properties.

(9) Measure the hot rolled flow properties as described in (6).

(10) Charge the hot rolled mud system to a high pressure stainless steel system, pressurize to 500 lbs./sq.in. with nitrogen gas pressure and roll at 300° F. for three hours.

(11) Cool the samples to room temperature. Readjust the pH to 9.5±0.1 with additional caustic soda and stir for five minutes before measuring Bombed properties.

(12) Measure the Bombed rheological flow properties as described in Step (6) above.

EXAMPLE II

This example illustrates the applicability of the invention to spent sulfite liquor obtained from hardwood with only the reducing sugars destroyed. Example II-A exemplifies a drilling fluid additive with no boron added while example II-B exemplifies an additive with boron added.

Example II-A 50 grams of sugar destroyed calcium hardwood spent sulfite liquor (B-41 Norlig 41 available from Reed Lignin Inc.) solids as a 25% solution in water was heated to 50° C. and treated with 9 grams of sulfuric acid (100%) as a 40.6% solution in water (22.2 grams) under mechanical agitation. The acidic reaction mixture heated to 85° C. and held 45 minutes. It was then cooled with air over a 15 minute period to 57° C. and 6.5 grams sodium dichromate dihydrate (100%) as a 20% solution in water (32.5 grams) added slowly with water cooling of the exothermic reaction. The reaction mixture was neutralized at 52° C. from 1.3 pH to 3.4 pH with 25 milliliters of 120 gram per liter calcium oxide slurry (3 grams of CaO) and subsequently filtered to remove precipitated gypsum (calcium sulfate dihydrate, 10 grams) which was discarded. The filtrate, containing 54.3 grams of chrome lignosulfonate, was spray dried at 230°–240° F. inlet temperature to recover solid powder chrome lignosulfonate.

Example II-B

Another 50 grams of sugar destroyed calcium base hardwood spent sulfite liquor was diluted to 25%, as in Example II-A. The solution was heated to 85° C. and treated with 9 grams of sulfuric acid as in Example II-A and 7.2 grams of boric acid. The reaction mixture was held at 80° C. for 30 minutes, cooled to 55° C. with air and 6.5 grams of sodium dichromate dihydrate (100%) as a 20% solution (32.5 grams) added slowly with water cooling. The reaction mixture, cooled to 55° C., was neutralized from 1.9 pH to 3.5 pH with 35 milliliters of 120 gram per liter calcium oxide slurry (4.2 grams of CaO) and fitered to remove precipitated gypsum (calcium sulfate dihydrate, 12 grams) which was discarded. The filtrate, containing 58.9 grams of boron-chrome lignosulfonate, was spray dried at 240° F. inlet temperature to recover solid powder boron-chrome lignosulfonate.

The two materials of Example II-A and II-B were evaluated as in Example 1. Test results are shown in Table 1.

EXAMPLE III

This example illustrates the applicability of the invention spent sulfite liquor obtained from hardwood without removing the reducing sugars. Example III-A exemplifies a drilling fluid additive with no boron added while example III-B exemplifies an additive with boron added.

300 grams of low reducing sugar calcium base hardwood spent sulfite liquor (Norlig 41d available from Reed Lignin Inc.) solids as a 35% solution in water was heated to 40° C. and treated with 54 grams of sulfuric acid (100%) as a 50% solution in water (108 grams) under mechanical agitation. The acidic reaction mixture was heated to 70° C. and 24 grams of manganese dioxide (100%) as a 35% slurry in water was added. The exothermic reaction reached a final temperature of 77° C. and was held for 25 minutes. The reaction mass at pH 2.6 was filtered to remove precipitated gypsum (calcium) sulfate dihydrate, 93 grams) which was discarded. The resulting filtrate solution contained 281.7 grams of solids as a 31.2% solution in water (903 grams) and was the raw material for Examples III-A and III-B.

Example III-A 130 grams of filtrate solids (416.7 grams of solution at 31.2%) was heated to 45° C. and treated with 16 grams of sulfuric acid (100%) as a 50% solution in water (32 grams). The reaction batch was heated further to 52° C. and 16 grams of sodium dichromate dihydrate (100%) added as a 35% solution in water (45.7 grams). The exothermic reaction mass at 58° C. was neutralized from pH 2.3 to pH 3.3 with 34 grams of 5 normal sodium hydroxide (5.7 grams of 100% NaOH). The resulting reaction mass, containing approximately 157.8 grams of manganese-chrome lignosulfonate, was spray dried at 240° F. inlet temperature to recover solid powder manganese-chrome lignosulfonate.

Example III-B

A second 130 grams of filtrate solids (416.7 grams of solution at 31.2%) from III above was heated to 45° C. and treated with 16 grams total of sulfuric acid (100%) as a 50% solution in water (32 grams). The batch was heated further to 70° C. and treated with 14.9 grams of boric acid. It was held at 80°–90° C. for 45 minutes, cooled to 55° C. and reacted with 16 grams of sodium dichromate dihydrate (100%) as a 35% solution in water (45.7 grams). The exothermic reaction mass at 58° C. was neutralized from pH 2.3 to pH 3.3 with 30 grams of 5 normal sodium hydroxide (5 grams of 100% NaOH). The resulting reaction mass, containing approximately 161.1 grams of boron-manganese-chrome lignosulfonate as a 30% water solution (537 grams) was spray dried at 240° F. inlet temperature to recover solid powder boron-manganese-chrome lignosulfonate.

The two products of Example III-A and III-B were evaluated as in Example I. Test results are shown on Table 1.

TABLE 1

| Chrome Lignosulfonate Reference 1 | Chrome Lignosulfonate Reference 2 | Chrome-Free Lignosulfonate Reference 3 | EXAMPLE I | | EXAMPLE II | | EXAMPLE III | |
|---|---|---|---|---|---|---|---|---|
| | | | A | B | A | B | A | B |
| INITIAL | | | | | | | | |

TABLE 1-continued

|  | Chrome Lignosulfonate Reference 1 | Chrome Lignosulfonate Reference 2 | Chrome-Free Lignosulfonate Reference 3 | EXAMPLE I | | EXAMPLE II | | EXAMPLE III | |
| --- | --- | --- | --- | --- | --- | --- | --- | --- | --- |
|  |  |  |  | A | B | A | B | A | B |
| Apparent Viscosity, cps | 36 | 24 | 22 | 31 | 19 | 24 | 19 | 44 | 28 |
| Yield Point (Lbs./100 sq.ft.) | 37 | 17 | 13 | 33 | 9 | 19 | 8 | 46 | 17 |
| Fann° 600 | 71 | 47 | 43 | 61 | 37 | 47 | 36 | 88 | 55 |
| 300 | 54 | 32 | 28 | 47 | 23 | 33 | 22 | 67 | 36 |
| 3 | 32 | 12 | 6 | 27 | 4 | 13 | 4 | 38 | 13 |
| 10 Min. Gel | 62 | 61 | 57 | 44 | 65 | 55 | 69 | 101 | 121 |
| HOT ROLLED 150° F. 16 HRS. | | | | | | | | | |
| Apparent Viscosity, cps | 47 | 25 | 21 | 32 | 17 | 26 | 18 | 60 | 36 |
| Yield Point (Lbs./100 sq.ft.) | 61 | 15 | 12 | 30 | 6 | 23 | 4 | 56 | 25 |
| Fann° 600 | 93 | 49 | 43 | 64 | 34 | 51 | 36 | 120 | 71 |
| 300 | 77 | 32 | 27 | 47 | 20 | 37 | 20 | 88 | 48 |
| 3 | 46 | 8 | 4 | 20 | 1 | 14 | 1 | 51 | 15 |
| 10 Min. Gel | 44 | 26 | 20 | 33 | 16 | 25 | 17 | 63 | 55 |
| BOMBED 300° F. 5 HRS. | | | | | | | | | |
| Apparent Viscosity, cps | 46 | 24 | 33 | 34 | 25 | 27 | 19 | 64 | 38 |
| Yield Point (Lbs./100 sq.ft.) | 56 | 13 | 31 | 34 | 14 | 23 | 9 | 58 | 29 |
| Fann° 600 | 92 | 47 | 65 | 68 | 50 | 53 | 37 | 128 | 75 |
| 300 | 74 | 30 | 48 | 51 | 32 | 38 | 23 | 93 | 52 |
| 3 | 41 | 5 | 24 | 24 | 7 | 16 | 5 | 52 | 15 |
| 10 Min. Gel | 36 | 23 | 38 | 26 | 25 | 26 | 20 | 43 | 40 |

Reference 1: Contains 3.4% chromium.
Reference 2: Contains 4.0% chromium.
Reference 3: Chromium-free iron complexed manganese lignosulfonate.

As shown in Table I, the products of examples I-B, II-B and III-B show improved rheological properties compared to other chrome lignosulfonates and chrome-free lignosulfonates. These improvements are evidenced from a comparison of the rheological properties, particularly the yield points of the different products. It is important that the comparison without and with boron in each example be recognized. It is here that the invention is best exemplified. For example, in Example III-B the yield point is 17 lbs/100 sq.ft. This yield point is identical to that of Reference 2 even though the raw sulfonated lignin material from which the additive of Example III-B was produced contained reducing sugars as well as polysaccharides.

Various modes of carrying out the invention are contemplated as being within the scope of the following claims particularly pointing out and distinctly claiming the subject matter which is regarded as the invention.

I claim:

1. An oil well drilling fluid additive comprising boron-chrome complexed sulfonated lignin-containing material having from about 1 to about 3 percent by weight boron and from about 2 to about 5 percent by weight chrome.

2. The oil well drilling fluid of claim 1, wherein said boron content is about 2 percent by weight.

3. The oil well drilling fluid of claim 1 wherein said chrome content is from about 3 percent to about 4 percent by weight.

4. The oil well drilling fluid of claim 1, wherein said boron content is about 2 percent by weight and said chrome content is from about 3 percent to about 4 percent by weight.

5. The oil well drilling fluid of claim 1, wherein said sulfonated lignin-containing material is obtained from hardwood.

6. The oil well drilling fluid of claim 1, wherein said sulfonated lignin-containing material is obtained from softwood.

7. An oil well drilling fluid composition comprising an aqueous suspension of clay material and an effective dispersing amount of a boron-chrome complexed sulfonated lignin-containing material having from about 1 to about 3 percent by weight boron and from about 2 to about 5 percent by weight chrome.

8. The oil well drilling fluid composition of claim 7, wherein said boron content is about 2 percent by weight. percent by weight.

9. The oil well drilling fluid composition of claim 7, wherein said chrome content is from about 3 percent to about 4 percent by weight.

10. The oil well drilling fluid composition of claim 7, wherein said boron content is about 2 percent by weight and said chrome content is from about 3 percent to about 4 percent by weight.

11. The oil well drilling fluid composition of claim 7, wherein said sulfonated lignin-containing material is obtained from hardwood.

12. The oil well drilling fluid composition of claim 7, wherein said sulfonated lignin-containing material is obtained from softwood.

13. A process for preparing sulfonated lignin-chrome-boron complex which comprises adding a compound of boron to a sulfonated lignin-containing material to form boron-complexed sulfonated lignin-containing material, and oxidizing the boron-complexed sulfonated lignin-containing material with a compound of chrome under acidic condition.

14. The process of claim 13, wherein said compound of boron is boric acid.

15. The process of claim 13, including the further step of purifying the sulfonated lignin-containing material by removing the reducing sugars therefrom.

16. A process for preparing sulfonated lignin-chrome-boron complex which comprises adding a compound of boron to a sulfonated lignin-containing material to form boron-complexed sulfonated lignin-containing material, oxidizing the boron-complexed sulfonated lignin-containing material, and complexing the oxidized boron-complexed sulfonated lignin-containing material with a compound of chrome under acidic conditions.

17. The process of claim 16, wherein said compound of boron is boric acid.

18. The process of claim 16, including the further step of purifying the sulfonated lignin-containing material by removing the reducing sugars therefrom.

19. The process of claim 16, wherein the step of oxidizing is carried out with an oxidizing agent selected from the group consisting of hydrogen peroxide, ozone, lead dioxide, chromic acid, chlorine, alkali and alkaline earth metal hypochlorites, alkali metal chromate, alkali metal permanganate, alkali metal persulfate, alkali metal perborate, manganese dioxide and combinations thereof.

20. The process of claim 16, wherein the complexing chrome compound is selected from the group consisting of sodium dichromate, potassium dichromate, chromic acid, chrome sulfate, chrome hydrates, chrome nitrate, chrome halides, chrome acetate, and combinations thereof.

* * * * *